United States Patent [19]

Brown et al.

[11] Patent Number: 5,896,380

[45] Date of Patent: Apr. 20, 1999

[54] MULTI-CORE ATM SWITCH WITH CELLS IN THE CORE FROM AN INLET FOR AN OUTLET BEING ALIGNED

[75] Inventors: David A. Brown, Carp; Stacy W. Nichols, Kanata; Maged E. Beshai, Stittaville, all of Canada

[73] Assignee: Northern Telecom Limited, Montreal, Canada

[21] Appl. No.: 08/796,550

[22] Filed: Feb. 6, 1997

[51] Int. Cl.⁶ .................................................. H04L 12/56

[52] U.S. Cl. ........................ 370/388; 370/412; 370/416; 370/395

[58] Field of Search ........................ 370/359, 360, 370/361, 367, 368, 369, 370, 371, 372, 374, 378, 380, 381, 387, 388, 389, 395, 412, 413, 414, 415, 416, 418

[56] References Cited

U.S. PATENT DOCUMENTS

| 5,241,536 | 8/1993 | Grimble et al. | 370/416 |
|---|---|---|---|
| 5,383,181 | 1/1995 | Aramaki | 370/388 |
| 5,732,087 | 3/1998 | Lauer et al. | 370/416 |
| 5,745,486 | 4/1998 | Beshai et al. | 370/352 |
| 5,784,374 | 2/1996 | Runaldue | 370/414 |

OTHER PUBLICATIONS

M. Beshai and E. Munter entitled "Multi-Tera-bit/s Switch based on Burst Transfer and Independent Shared Buffers", Globecom, Singapore, Nov. 1995, pp. 1724–1730.

*Primary Examiner*—Chau Nguyen
*Assistant Examiner*—Phuongchau Ba Nguyen

[57] ABSTRACT

A multi-stage ATM switch has a plurality of inlet stage fabrics, core stage fabrics and outlet stage fabrics. ATM cells routed by the switch have destination fields including (i) an identification of the outlet stage fabric and (ii) an identification of the outlet port. Cells incoming to a given inlet stage fabric are queued up in queues representing each of the outlet stage fabrics. A queue having at least the number of cells as there are core stage fabrics (or one having a lesser number of cells where cells have been waiting longer than an a pre-defined time) is identified and, in a time slot, cells are transmitted from the front of the identified queue, in parallel, one to each of the core stage fabrics (with blank make-up cells being sent, as necessary, where the identified queue had less cells than there are core stage fabrics). In the core stage fabrics, the incoming cells are again queued up in queues representing each of the outlet stage fabrics and then cells are transmitted from the heads of these queues to the outlet stage fabrics. At the outlet stage fabrics, incoming cells are queued in queues representing the outlet ports to which these cells are destined and cells are output from the heads of these queues.

19 Claims, 9 Drawing Sheets

TABLE 1: MATURITY TABLE

| NUMBER OF WAITING CELLS | 1 | 2 | 3 | ≥ 4 |
|---|---|---|---|---|
| REQUIRED MATURITY (SLOTS) | 120 | 80 | 40 | 0 |

FIG. 6

| | SLOT T | SLOT T + 1 | | | | | | | | | | | | | SLOT T + 15 |
|---|---|---|---|---|---|---|---|---|---|---|---|---|---|---|---|
| NEW CELLS | 0 | 0 | 1 | 1 | 1 | 0 | 1 | 1 | 0 | 0 | 1 | 1 | 1 | 1 | 1 |
| TRANSFERRED CELLS | 0 | 0 | 0 | 0 | 0 | 0 | 0 | 4 | 0 | 0 | 0 | 0 | 0 | 4 | 0 |
| WAITING CELLS | 1 | 1 | 2 | 3 | 4 | 4 | 5 | 2 | 2 | 2 | 3 | 4 | 5 | 6 | 3 | 4 |
| AGE | 5 | 6 | 7 | 8 | 0 | 0 | 1 | 2 | 3 | 4 | 5 | 0 | 1 | 2 | 3 | 0 |
| | | | | | RESET | | | | | | | RESET | | | | RESET |

FIG. 7

OUTLETS

| WAITING CELLS | •• ↑ | •••••• ↑ | • ↑ | •••••• ↑ | | INTRA-SWITCHING | •••• | ••• ↑ |
|---|---|---|---|---|---|---|---|---|
| | 0 | 1 | 2 | 3 | 4 | 5 | 6 | 7 |
| COUNT | 2 | 7 | 1 | 6 | 0 | | 4 | 3 |
| AGE | 74 | 18 | 124 | 4 | 0 | | 0 | 28 |
| STATUS | WAIT | READY | READY | READY | N/A | | READY | WAIT |

| TIME SLOTS | | OUTLETS | | | | | | | | CYCLIC SLOT 0 | | | CYCLIC SLOT 3 |
|---|---|---|---|---|---|---|---|---|---|---|---|---|---|
| | | 0 | 1 | 2 | 3 | 4 | 5 | 6 | 7 | | | | |
| N | COUNT | 3 | | ④ | 4 | 2 | 1 | 0 | 0 | | 2 | 2 | 4 |
| | CYCLIC AGE | 12 | | 7 | 0 | 38 | 116 | | | | NEW ARRIVAL DESTINATION | | |
| N + 4 | | 3 | | 2 | ④ | 3 | 1 | 0 | 0 | 7 | | 6 | 7 |
| | | 13 | | 3 | 0 | 39 | 117 | | | | | | |
| N + 8 | | 3 | | 2 | 0 | ③ | 1 | 1 | 2 | 7 | 3 | 7 | |
| | | 14 | | 4 | 0 | 40 | 118 | 2 | 4 | | | | |
| N + 12 | | ③ | | 2 | 1 | 0 | 1 | 1 | 4 | 2 | 0 | | 0 |
| | | 15 | | 5 | 3 | 0 | 119 | 2 | 0 | | | | |
| N + 16 | | 2 | | 3 | 1 | 0 | ① | 1 | 4 | 0 | 5 | 0 | 5 |
| | | 3 | | 6 | 4 | 0 | 120 | 3 | 0 | | | | |
| N + 20 | | 2 | | 3 | 3 | 0 | 2 | 3 | ④ | | | | |
| | | 4 | | 6 | 5 | 0 | 3 | 4 | 0 | | | | |

MULTI-CORE ATM SWITCH WITH CELLS IN THE CORE FROM AN INLET FOR AN OUTLET BEING ALIGNED

BACKGROUND OF THE INVENTION

This invention relates to a multi-stage ATM switch and to a method for switching ATM cells in a multi-stage ATM switch.

In an asynchronous transfer mode (ATM) network, data is transferred in ATM cells. Each ATM cell has a payload data field and a destination field. The destination field includes information on the destination for the cell so that the ATM cell can be properly routed through an ATM switch. As will be appreciated by those skilled in the art, ATM cells generally propagate asynchronously through an ATM network, but are synchronously handled in switches in the network.

Multi-stage ATM switches having an inlet (or first) stage, a core (or second) stage, and an outlet (or third) stage are known. The outlet stage terminates in the outlet ports of the switch. Each stage is typically implemented with a plurality of fabrics to increase the switch size.

In one known multi-stage switch, the destination field of ATM cells routed through the switch specify (i) a destination core stage fabric, (ii) a destination outlet stage fabric, and (iii) a destination outlet port of the destination outlet stage fabric. To ensure that the order of cells is preserved through the switch, cells incoming to a given channel of an inlet stage fabric are always routed through the same core stage fabric. Where a high number of cells arrive on any one channel of an inlet fabric, the ATM switch can become congested.

In another known multi-stage switch, which is described in an article by M. Beshai and E. Munter entitled "Multi-Tera-bit/s Switch based on Burst Transfer and Independent Shared Buffers", Globecom. Singapore, November 1995, the three stages are rotator-linked and, in a straight-forward implementation, comprise an equal number of inlet, core, and outlet stage fabrics. ATM cells routed through the switch have a destination field specifying (i) a destination outlet stage fabric and (ii) a destination outlet port of the destination outlet stage fabric. Each inlet stage fabric has a plurality of queues, one representing each of the outlet stage fabrics. A cell migrating to a given inlet stage fabric is placed into a queue in the inlet stage fabric based on the destination outlet stage fabric identified in the destination field of the ATM cell. In a given connection period, the inlet stage fabrics are connected to the core stage fabrics by an inlet rotator so that, for any given core stage fabric, there is one inlet stage fabric connected to it; in the next connection period, each inlet stage fabric is connected to a different core stage fabric by the inlet rotator. In this way, during an inlet rotator cycle, each inlet stage fabric visits each core stage fabric. Similarly, in a given connection period, the core stage fabrics are connected to the outlet stage fabrics by an outlet rotator on a rotating basis such that during an outlet rotator cycle, each core stage fabric visits each outlet stage fabric.

During a given connection period, each inlet stage fabric transfers a burst of cells to the core stage fabric to which it is connected, up to a pre-defined maximum number. The cells in the burst can be destined to different outlet stage fabrics. Each core stage fabric has a number of fixed length buffers, one representative of each outlet stage fabric. The cells in the burst are placed into these buffers based on their destination outlet stage fabric. However, since the buffers are of a fixed length, prior to the burst the core stage fabric indicates to the inlet stage fabric the maximum permissible number of cells from each queue which may be part of the burst.

During the given connection period, each core stage fabric is connected to one outlet stage fabric by the outlet rotator and the core stage fabric transfers the entire contents of its buffer for that outlet stage fabric to the outlet stage fabric. The maximum length of the buffer is chosen so that there is time during the connection period to exhaust the buffer.

It is necessary that the order of cells in a given queue of any one inlet fabric be preserved since these cells could all relate to one connected call. Such cell order is preserved by having each core fabric visited sequentially by inlet fabrics and by having each core fabric visit the outlet fabrics sequentially and exhaust the buffer representing the outlet fabric visited.

Cells arriving at an outlet fabric are placed into queues representing the outlet ports to which the queues are destined.

Such a switch requires control communication between the inlet and control stages.

This invention seeks to overcome drawbacks of known multi-stage ATM switches.

BRIEF SUMMARY OF THE INVENTION

According to the present invention, there is provided a multi-stage ATM switch, comprising an inlet stage comprising a plurality of inlet stage fabrics; a core stage comprising a plurality of core stage fabrics; an outlet stage comprising a plurality of outlet stage fabrics, each of said outlet stage fabrics having a plurality of outlet ports; each inlet stage fabric of said inlet stage fabrics having a queue representing each outlet stage fabric; a plurality of inlet stage ports, with each inlet stage port connecting said each inlet stage fabric to one of said core fabrics such that there is an inlet stage port connecting said each inlet stage fabric to each of said core fabrics; each core stage fabric of said core stage fabrics having: a queue representing each outlet stage fabric; a plurality of core stage ports with each core stage port connecting said each core stage fabric to one of said outlet stage fabrics such that there is a core stage port connecting said each core stage fabric Lo each of said outlet stage fabrics; each of said outlet stage fabrics having a queue for each of said outlet ports; for each of said inlet stage fabrics, an inlet stage queuer for queuing each incoming ATM cell in an inlet stage queue based on destination information in said incoming cell which indicates an outlet stage fabric to which said incoming cell is destined; for each of said core stage fabrics, a core stage queuer for queuing each incoming ATM cell incoming in a core stage queue based on destination information in said incoming cell which indicates an outlet stage fabric to which said incoming cell is destined; for each of said outlet stage fabrics, an outlet stage queuer for queuing each incoming ATM cell in an outlet stage queue based on destination information in said incoming cell which indicates an outlet port to which said incoming cell is destined; for each of said plurality of inlet stage fabrics, a scheduler for choosing an inlet stage queue and, in a time interval, transmitting a group of consecutive ATM cells from said chosen inlet stage queue beginning with an ATM cell at a head of said chosen inlet stage queue, said group comprising as many ATM cells as there are core stage fabrics, one ATM cell of said group being transmitted to each of said core stage fabrics; a plurality of core stage controllers, one controller for each of said plurality of core stage fabrics, said controllers for transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said inlet stage queue; for each of said plurality of outlet stage fabrics, an outlet controller for transmitting ATM cells at heads of outlet stage fabric queues to the outlet ports represented by said queues.

In accordance with another aspect of the invention, there is provided a method for switching ATM cells in a switch having an inlet stage comprising a plurality of inlet stage fabrics, a core stage comprising a plurality of core stage fabrics, and an outlet stage comprising a plurality of outlet stage fabrics, each of said outlet stage fabrics having a plurality of outlet ports, comprising the steps of: examining destination information of each ATM cell incoming to a given inlet stage fabric for an indication of an outlet stage fabric to which said incoming cell is destined and queuing said incoming cell in a queue of said given inlet stage fabric representing said outlet stage fabric; for each of said plurality of inlet stage fabrics, choosing an inlet stage queue and, in a time interval, transmitting a group of consecutive ATM cells from said inlet stage queue beginning with an ATM cell at a head of said inlet stage queue, said group comprising as many ATM cells as there are core stage fabrics, one ATM cell of said group being transmitted to each of said core stage fabrics; examining destination information of each ATM cell incoming to a given core stage fabric for an indication of an outlet stage fabric to which said incoming cell is destined and queuing said incoming cell in a queue of said given core stage fabric representing said outlet stage fabric; transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said single inlet stage queue, examining destination information of each ATM cell incoming to a given outlet stage fabric for an indication of an outlet port to which said incoming cell is destined and queuing said incoming cell in a queue of said given outlet stage fabric representing said outlet port; transmitting any ATM cell at a head of each queue of an outlet stage fabric to the outlet port represented by said queue.

BRIEF DESCRIPTION OF THE SEVERAL VIEWS OF THE DRAWING

In the figures which illustrate example embodiments of the invention,

FIG. 6 is a table for use in an embodiment of the ATM switches of any of FIGS. 1 to 5, FIG. 7 is an exemplary chart illustrating the operation of the embodiment of FIG. 6, FIG. 9 is an exemplary chart illustrating the state of elements in an embodiment of FIG. 6 when applied in conjunction with ATM switches of FIG. 5, FIG. 10 is an exemplary chart illustrating the state of elements in the embodiment of FIG. 9.

DETAILED DESCRIPTION OF THE PREFERRED EMBODIMENTS OF THE INVENTION

Figure 1:
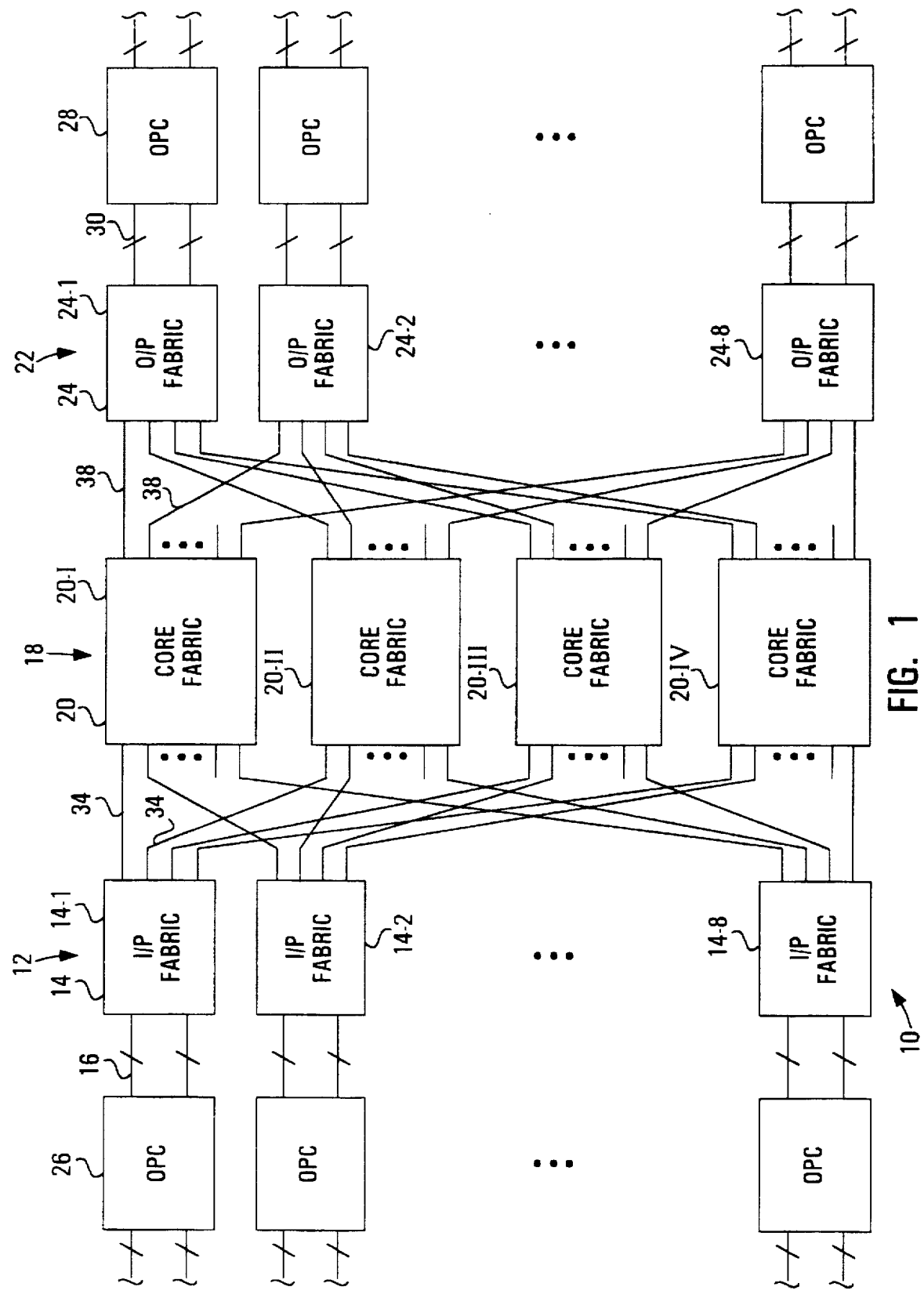
FIG. 1 is a schematic diagram of a multi-stage ATM switch made in accordance with this invention.

Turning to FIG. 1, a multi-stage ATM switch generally indicated at 10 comprises an inlet stage, indicated generally at 12, with a plurality of inlet stage fabrics 14, a core stage, indicated generally at 18, comprising a plurality of core stage fabrics 20, and an outlet stage, indicated generally at 22, comprising a plurality of outlet stage fabrics 24. In the example embodiment of FIG. 1, there are eight inlet stage fabrics (14-1 to 14-8), four core stage fabrics (20-I to 20-IV), and eight outlet stage fabrics (24-1 to 24-8).

Each inlet stage fabric has eight inlet channels 16 extending from an optical converter (OPC) 26; the eight outlet ports 30 of each outlet stage fabric 24 output to an OPC 28.

Each inlet stage fabric 14 has four inlet stage ports 34, with each inlet stage port 34 of a given inlet stage fabric 14 connecting the fabric 14 to one of the core fabrics 20. With this arrangement, for a given inlet stage fabric, there is an inlet stage port 34 connecting the fabric to each of the core fabrics. Each core stage fabric 20 has eight core stage ports 38 with each core stage port 38 of a given core stage fabric 20 connecting the core stage fabric to one of the outlet stage fabrics 24 so that, for a given core stage fabric, there is a core stage port 38 connecting the core stage fabric to each of the outlet stage fabrics 24.

Figure 2:
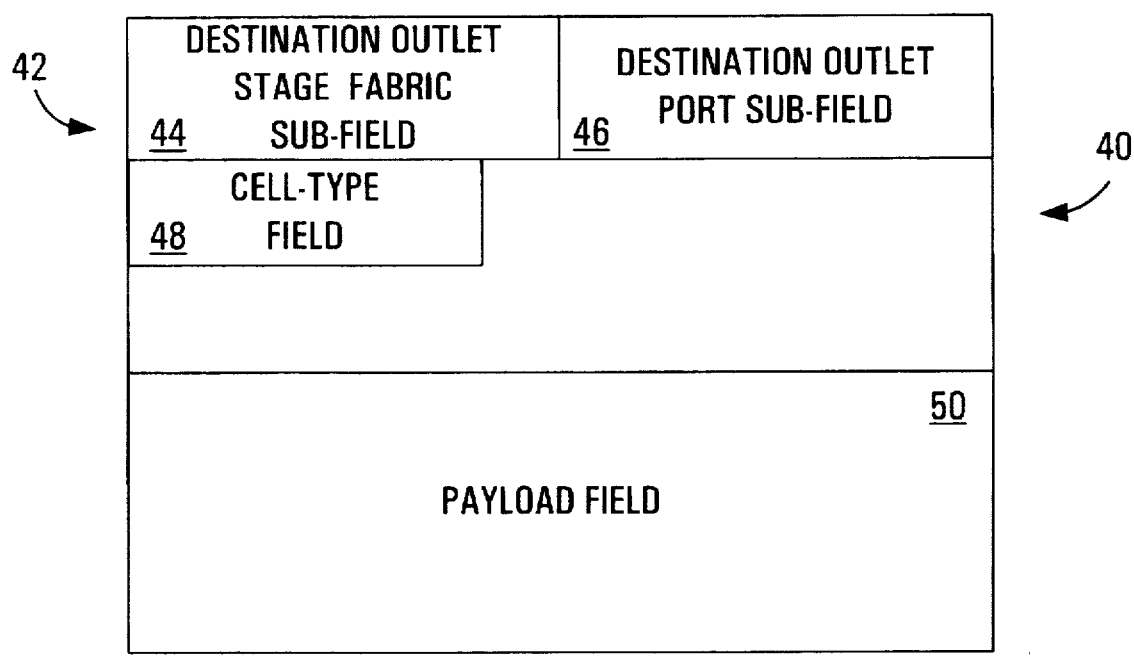
FIG. 2 is a schematic diagram of an ATM cell for use in the ATM switch of FIG. 1.

The ATM switch 10 is intended to switch ATM cells of the type illustrated in FIG. 2. Turning to FIG. 2, an ATM cell 40 comprises a destination field 42 with a sub-field 44 indicating the destination outlet stage fabric of the cell and a sub-field 46 indicating the destination outlet port of the destination outlet stage fabric. The cell also has a cell-type field 48, and a payload field 50 containing the payload data of the cell.

Figure 3:
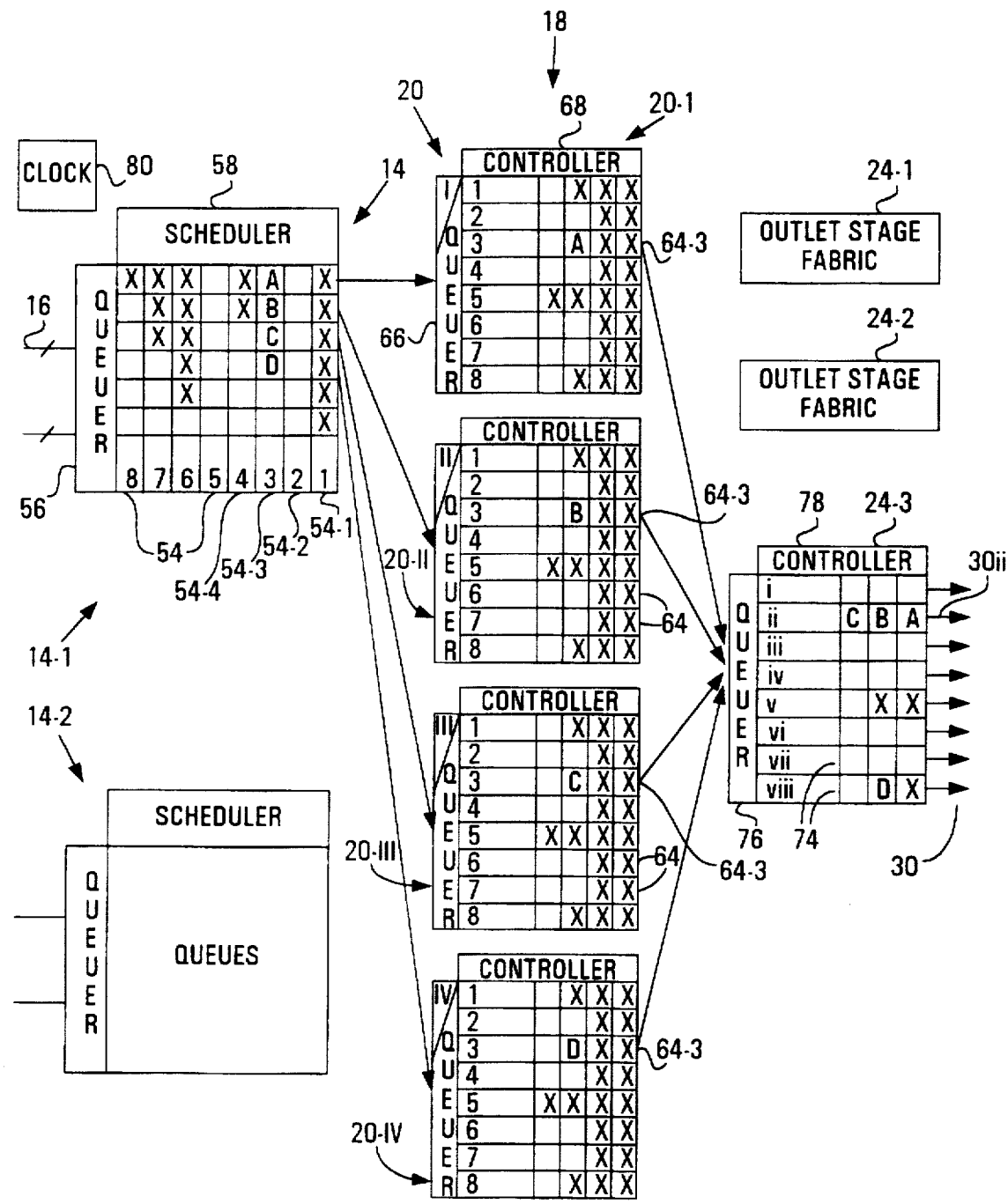
FIG. 3 is a schematic diagram of a portion of the ATM switch of FIG. 1 illustrating the operation of the switch.

Referencing FIG. 3, which details a portion of the switch of FIG. 1, each inlet stage fabric 14 has eight queues 54, one representing each of the eight outlet stage fabrics 24. Each inlet stage fabric also has an inlet stage queuer 56 for queuing each ATM cell incoming on one of the inlet channels 16 of the fabric in one of the eight inlet stage queues 54 based on the sub-field 44 (FIG. 2) of the destination field of the incoming cell which identifies the destination outlet stage fabric. Each inlet stage fabric also has a scheduler 58. As will be explained further hereinafter, the scheduler is for choosing an inlet stage queue 54 and transmitting a group of four consecutive ATM cells from the front of the chosen inlet stage queue (which group, being from the same inlet stage queue, is necessarily destined for the same outlet stage fabric).

Each core stage fabric 20 has eight queues 64, one representing each of the eight outlet stage fabrics 24. Each core stage fabric also has a core stage queuer 66 for queuing each incoming ATM cell in one of the eight cone stage queues 64 based on the subfield of the destination field of the incoming cell which identifies the destination outlet stage fabric. Each core stage fabric also has a core controller 68. In each clock cycle, the core controller chooses a cell to transmits from the head of each core stage queue 64 to the outlet stage fabric 24 represented by the queue.

Each outlet stage fabric 24 has eight queues 74, one representing each of the eight outlet ports 30 of the outlet stage fabric. Each outlet stage fabric also has an outlet stage queuer 76 for queuing each incoming ATM cell in one of the eight outlet stage queues based on the sub-field 46 (FIG. 2) of the destination field of the incoming cell which identifies the destination outlet port. Each outlet stage fabric further has an outlet controller 78 for, when prompted, transmitting any ATM cell at a head of each queue 74 to the outlet port 30 associated with the queue.

The schedulers 58, the controllers 68 and 78, and the queuers 66, 76 are input with a clock timing signal from a master clock 80.

The operation of the switch is described in conjunction with FIG. 3. If an ATM cell arrives on an inlet channel 16 of inlet stage fabric 14-1 from the OPC 26 connected to fabric 14-1, queuer 56 of fabric 14-1 examines the destination field 42 (FIG. 2) of the cell to locate the sub-field 44 (FIG. 2) which identifies the destination outlet stage fabric. The queuer then queues the cell in the inlet stage queue 54 which represents the outlet stage fabric identified in this subfield 44 (FIG. 2). For example, say an ATM cell "A" arrives on an inlet channel 16 which cell identifies the third outlet stage fabric 24-3 in sub-field 44 (FIG. 3). In such case, the queuer will queue cell "A" in the first available spot in queue 54-3 of the inlet stage fabric, say the head of this queue. Other ATM cells, indicated generically as "X", may arrive destined for any of the outlet stage fabrics other than the third outlet stage fabric 24-3, and these will be queued on queues 54 other than queue 54-3. Eventually, however, another cell "B" may arrive destined for the third outlet stage fabric 24-3. Queuer 56 will queue this cell in queue 54-3 behind cell "A". When cells "C" and "D" later arrive also destined for outlet stage fabric 24-3, these cells will be queued on queue 54-3 in sequence behind cell "B". This process continues whenever a cell arrives on an inlet channel 16 of inlet stage fabric 14-1. A similar process occurs in each of the other inlet stage fabrics so that cells also accumulate in the queues of these other fabrics.

Scheduler 58 searches for queues 54 of inlet stage fabric 14-1 having at least four cells (more generically, it is searching for queues with as many cells as there are core stage fabrics) on a circulating basis. Say, for example, it is currently looking at queue 54-2 for four cells, if queue 54-2 has less than four cells, it will pass next to queue 54-3, and so on. If, say, queue 53 was the first queue to have four cells, it would stop its search there. On its next search, however, it would begin by looking at queue 54-4, and so on.

If, in the current search, queue 54-3 is the first queue found with four or more cells, then in the time interval assigned to scheduler 58—i.e., the next clock cycle from clock 80 to which scheduler 58 is programmed to respond - the scheduler 58 sends four consecutive cells from the front of queue 54-3 (i.e., four consecutive cells beginning with the cell at the head of the queue). These four cells are sent to the core stage 18 in parallel and, therefore, as a parallel cell burst. The four core stage fabrics 20-I, 20-II, 20-III, and 20-IV are notionally assigned to a first, second, third, and fourth rank, respectively, and the scheduler is designed to send the cell ("A") at the head of the queue to the first ranked core stage fabric 20-I, the next cell ("B") in the queue to the second ranked core stage fabric 20-II, the third rank cell ("C") in queue 54-3 to core stage fabric 20-III and the fourth rank cell ("D") to core stage fabric 20-IV.

When the queuer 66 of core stage fabric 20-I receives cell "A", it examines sub-field 44 (FIG. 2) of its destination field 42 (FIG. 2) and, based on this examination, places the cell in a queue 64, in this case queue 64-3 representing the third outlet stage fabric 24-3. The queuers of core stages 20-II, 20-III, and 20-IV similarly act to place each of cells "B", "C", and "D" in their queues representing outlet stage fabric 24-3. FIG. 3 illustrates cells "A", "B", "C", and "D" in the core stage as they may appear there after transmission from the inlet stage.

If, per chance, scheduler 58 of inlet stage fabric 14-1 finds no queue with four cells to transmit, it may choose the queue with the greatest number of cells and pad this queue up to four cells with "blank" ATM cells (i.e., cells with no payload data) so that the scheduler may transmit cells when requested. When creating a "blank" ATM cell, the schedular assigns a "blank cell" cell-type to cell-type field 48 (FIG. 2) of the cell.

The other inlet stage fabrics transmit cells to the core stage in a similar manner, however, each inlet stage fabric is assigned its own tune intervals within which to send cells, as follows. Inlet stage fabric 14-1 first transmits two groups of four consecutive cells, one group on each of two consecutive clock cycles. Thereafter, inlet stage fabric 14-2 transmits two groups of cells in the next two clock cycles, and so on, on a circulating basis.

It is important to recognize that, with this arrangement, each of the four cells in a cell burst will appear on the same numbered queue in one of the core stage fabrics and will each have the same rank in such queues. For example, FIG. 3 shows each of cells "A", "B", "C", and "D" in the third queue of each of the core stage fabrics 20-I, 20-II, 20-III, and 20-IV, respectively, and shows each as the third cell in this queue. This result follows from the fact that four cells in a burst are all destined for the same outlet stage fabric and so each will be placed on the queue for that outlet stage fabric in each of the four core stage fabrics. Thus, whenever a cell is added to one particular queue in a core stage fabric, a cell is necessarily added to the corresponding queue of each of the other core stage fabrics. Therefore, corresponding queues in each of the four core stage fabrics are always the same length, with cells at a given rank in the queue all originating from one inlet stage fabric. Put another way, the cells from a burst are all aligned in the core stage.

As described, four cells arrive at the core stage fabric 18 every clock cycle.

Clock 80 is also used to clock cells out of the core stage 18 and into the outlet stage 22. On each cycle of clock 80, the controller 68 of each of the four core stage fabrics 20 transmits one cell from a corresponding one of its eight queues so that four cells are transmitted in one clock cycle all destined for the same outlet stage fabric. The corresponding queues may be chosen without inter-core stage fabric communication because a given queue in a given core stage fabric will always be of the same length as the corresponding queue in each of the other core stage fabrics. One simple implementation is for the core stages to send cells from their queues on a circulating basis, skipping empty queues.

It will be recalled that in a burst of cells from an inlet stage fabric to the core, the cell which was at the head of the queue in the inlet stage fabric is transmitted to core stage fabric 20-I, the next cell to core stage fabric 20-II and so on. To preserve this order in cells leaving the core, the cells leave the core in a slightly time staggered fashion, with a cell from core stage fabric 20-I always ahead of a cell from core stage fabric 20-II which, in turn, is always ahead of a cell from core stage fabric 20-III, and with a cell from core stage fabric 20-IV always transmitted last. Thus, the core stage fabrics are notionally assigned the same rank for the purpose of cell read-out as they were for the purpose of cell read-in.

When the core stage fabrics each transmit a cell in a clock cycle, four cells will arrive at (a FIFO buffer) of one outlet stage fabric. The queuer 76 of this outlet stage fabric will queue the incoming cells to the queues representing the appropriate outlet port based on an examination of sub-field 46 (FIG. 3) of the destination field 42 (FIG. 2) of the cell. Because of the staggering of the outputs from the core stage fabrics, if it happens that two or more cells destined for a given outlet stage fabric are destined for a single outlet port, these cells will be maintained in the order in which they were found in the inlet stage fabric queue for that outlet stage fabric. Thus, if, for example, cells "A", "B", and "C", were all destined for port 30ii of outlet fabric 24-3, then, as illustrated in FIG. 3, these cells would maintain the same order as when such cells were queued at the inlet stage fabric 14-1.

When examining the destination field 42 (FIG. 2) of the cell, the queuer 76 also examines the cell-type field 48 (FIG. 2). If this field indicates that the cell is a blank cell, then the queuer simply discards the cell rather than queuing it.

Clock 80 may also be used to clock cells out of the outlet ports 30 of the outlet stage fabrics 24. However, since there is no need to maintain synchronism outside of the ATM switch, the controller 78 of each outlet stage fabric may clock out a cell at the head of any number of its outlet ports on each cycle of the clock.

It will be apparent from the foregoing that the "information" as to which queue in an inlet stage fabric a cell came from is lost when the cell is transmitted to the core stage fabric. This "information" is regained when the destination field of the cell is again examined in the core stage and the cell queued up in a core stage fabric. Nevertheless, the queuing in the inlet stage is needed to ensure that the order of cells which may be from a given call connection is preserved in the switch.

As is conventional, a router upstream of ATM switch 10 will add appropriate destination information to the destination fields of ATM cells which are to be switched through the switch 10.

Serial to Parallel Conversion in Inlet Fabrics

Figure 4:
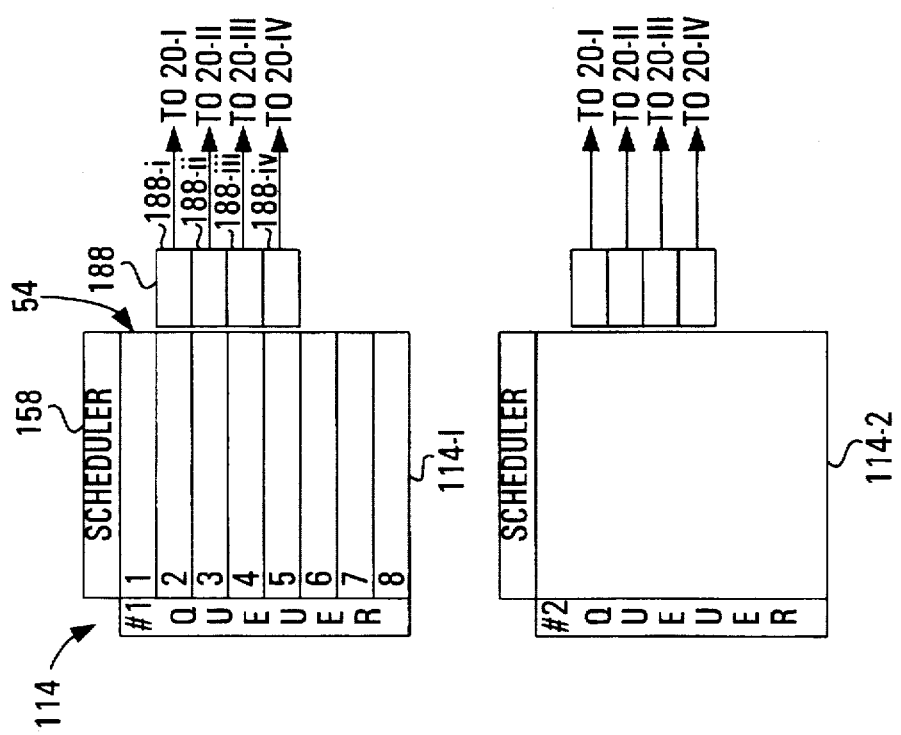
FIG. 4 is a schematic diagram of a portion of an ATM switch made in accordance with another embodiment of this invention.

In an alternative embodiment illustrated in FIG. 4, each inlet stage fabric 114 has a four cell buffer 188 associated with it, with one cell position of the buffer connected to one core fabric such that cell position 188-i of the buffer is connected to core fabric 20I, cell position 188-ii is connected to sore fabric 20-II and cell positions 188-iii and 188-iv are connected to core fabrics 20-III and 20-IV, respectively. The core stage and outlet stage of the switch of FIG. 4 is identical to that of FIGS. I to 3.

In operation of the switch of FIG. 4, incoming cells to an inlet fabric are queued in queues 54 of the fabric based on the destination outlet fabric for the cell, as in the switch of FIGS. 1 to 3. The schedulers 158 of the inlet stage fabrics each select a queue for cell transfer before a "sampling" time slot. The first four inlet stage fabrics have the same sampling time slot; the sampling time slot for the remaining four inlet stage fabrics is four time slots thereafter. During the sampling time slot for the first four inlet stage fabrics, these fabrics each transfer the cell at the head of their selected queue to cell position 188-i of their buffer 188. In the next time slot, these four fabrics transfer the second ranking cell in the selected queue, which has now advise to the head of the queue, to position 188-ii of their buffer. Similarly., in the subsequent two time slots, these four fabrics transfer the next two consecutive cells in the selected queue to positions 188-iii and 188-iv of their buffer 188. In the following time slot (lime interval), the four cells in the buffer 188 of inlet fabric 114-1 are parallel transferred as a burst of cells to the four core fabrics such that the cell in cell position 188-i inputs core fabric 20-I, the cell in cell position 188-ii inputs core fabric 20-II, and so on. In the next time slot, the four cells in the buffer of inlet fabric 114-2 are parallel transferred as a burst of cells to the core fabrics in like fashion. And similarly for the next two inlet fabrics in the next two time slots. The sampling time slot for the four remaining inlet stage fabrics occurs in the time slot when the first inlet stage fabric 114-1 is parallel transferring its cells to the core stage fabrics. Thus, these remaining four fabrics each transfer a cell to cell position 188-i of their buffer 188 during this lime slot. In this way, each of the remaining four inlet stage fabrics have filled their buffers and are ready to parallel transfer their cells as soon as the last of the first four inlet stage fabrics has parallel transferred its cells to the core stage fabrics. After any sampling time, an inlet stage fabric begins the process of selecting a new queue for use during the next sampling time. Consequently, the process of one set of four inlet stage fabrics filling their buffers 188 while the other set of four inlet stage fabrics sequentially parallel transfer the contents of their buffers 188 to the core stage fabrics proceeds in a continuous fashion.

This operation results in cells from a cell burst being aligned in the core, as in the switch of FIGS. 1 to 3. The operation of the switch of FIG. 4 in the core stage and outlet stage is identical to that described in conjunction with the switch of FIGS. 1 to 3.

Folded Architecture

Figure 5:
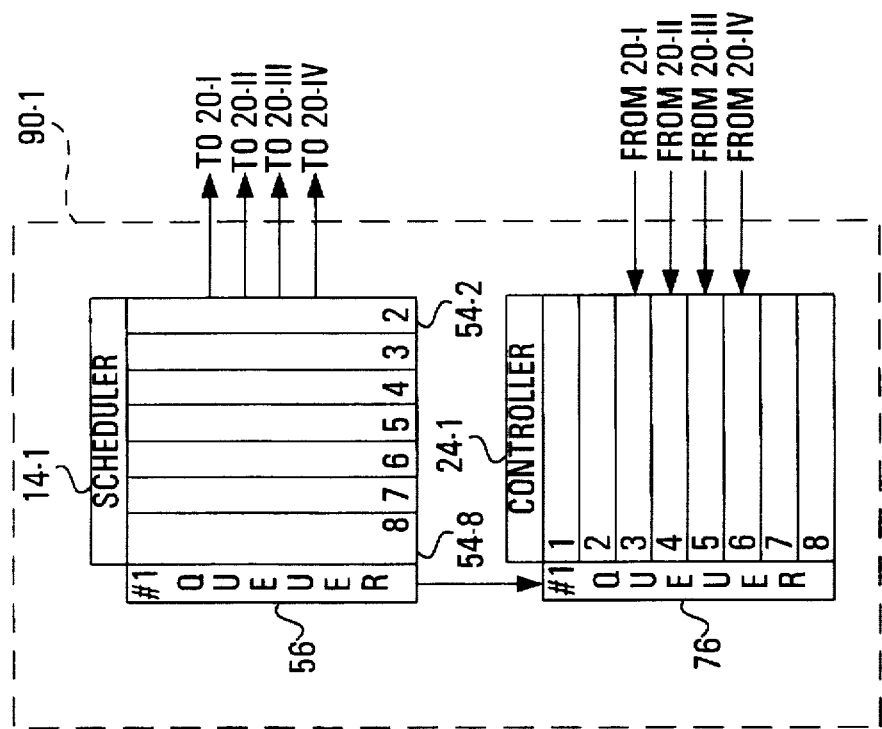
FIG. 5 is a schematic diagram of a portion of an ATM switch made in accordance with a further embodiment of this invention.

In the example embodiments of FIGS. 1 to 4, there are the same number of inlet stage fabrics 14 and outlet stage fabrics 24. This allows for the possibility of implementing a given inlet stage fabric and a corresponding outlet stage fabric on the same fabric. FIG. 5 schematically represents this "folded" architecture. Turning to FIG. 5, it is illustrated that inlet stage fabric 14-1 and outlet stage fabric 24-1 are implemented on the same physical switch fabric 90-1. The remaining inlet and outlet stage fabrics are similarly implemented. With this arrangement, whenever a cell arrives at inlet stage fabric 14-1, if queuer 56 determines the cell is destined for any of the outlet stage fabrics other than outlet stage fabric 24-1, it places the cell on an appropriate one of the queues 54-2 to 54-8, as described in conjunction with FIGS. 1 to 3. However, if the queuer determines that the cell is destined for outlet stage 24-1, then the queuer 56 passes this cell directly to queuer 76 of outlet stage 24-1. (Consequently, inlet stage fabric 14-1 need have no queue representing outlet stage fabric 24-1.) Queuer 76 of outlet stage fabric 24-1 will handle this incoming cell in exactly the same fashion as other incoming cells, as described in conjunction with FIGS. 1 to 3. However, it may store the cell in an inlet buffer until a clock cycle during which it does not receive a cell from any of the core stage fabrics.

Cell-Scheduling

In the embodiments described above, the scheduler 58 of an input stage fabric chooses a queue for cell-group transfer by looking, on a circulating basis, for the first queue with at least four cells. Alternatively, scheduler 58 of an inlet stage fabric may inspect all queues during each switch cycle and select the queue with the largest number of waiting cells for cell-group transfer. Both approaches could result in excessive delays for inlet-outlet fabric pairs of low community of interest. Indeed, under heavy load, it would be possible for a call connection to be locked-out for an extended period of time. The drawbacks with these cell scheduling techniques can easily be solved by using a cell-group age as a factor in the scheduling function.

In order to achieve fairness and efficiency at the same time, the cell-group transfer should depend on both the number of waiting cells and the age of a specific cell in the queue, hereafter called the critical cell. With the cells being stored in a FIFO discipline in each queue, and with K waiting cells in a queue, the critical cell is the cell in position 4⌊K/4⌋ relative to the position of the head of the queue (⌊q⌋ denotes the integer part of a real number q).

Keeping track of the critical cell age can be done by a simple process as explained below. A cell counter and an age counter are needed for this process. The cell counter of each queue is zero initialized, and is increased by one when a new cell joins the queue. When the cell counter for queue Y reaches four, the age counter of queue Y is reset to zero. The first cell which arrives to queue Y when the content of its age counter is zero starts the age counting process for queue Y, and the counter content is increased by one then and in each time slot (i.e. clock cycle) thereafter.

The scheduler of inlet-fabric X scans all the cell queues (unless the switch is in the folded configuration in which case queue X is not scanned since it transfers its cells internally). A queue to destination Y is ready for cell-group transfer if:

(1) there are at least four cells waiting in queue X-Y, or (2) the queue age equals or exceeds the minimum age specified in a maturity table (FIG. 6).

In the maturity table of FIG. 6, the age of transfer eligibility is a function of the number of waiting cells. The higher the number of waiting cells for the same destination outlet fabric, the lower is the waiting time needed for transfer eligibility. There is no minimum waiting time imposed when the number of waiting cells is four or more.

FIG. 7 illustrates the function of an inlet fabric scheduler over a selected interval of sixteen time slots. A maximum of one cell per inlet fabric arrives during a time slot. Here, we observe the traffic destined to a given outlet fabric Y from inlet fabric X. The cell arrival is shown in the top row. The next row shows the number of cells under preparation for transfer to the core during each slot. Once the scheduler decides to transfer a cell group from a queue, the age counter of the queue is reset to zero if the transfer results in an empty queue. Similarly, once the number of waiting cells reaches the full size of a cell group (four in this example) or integer multiples thereof, the age counter is reset to zero.

Figure 8:
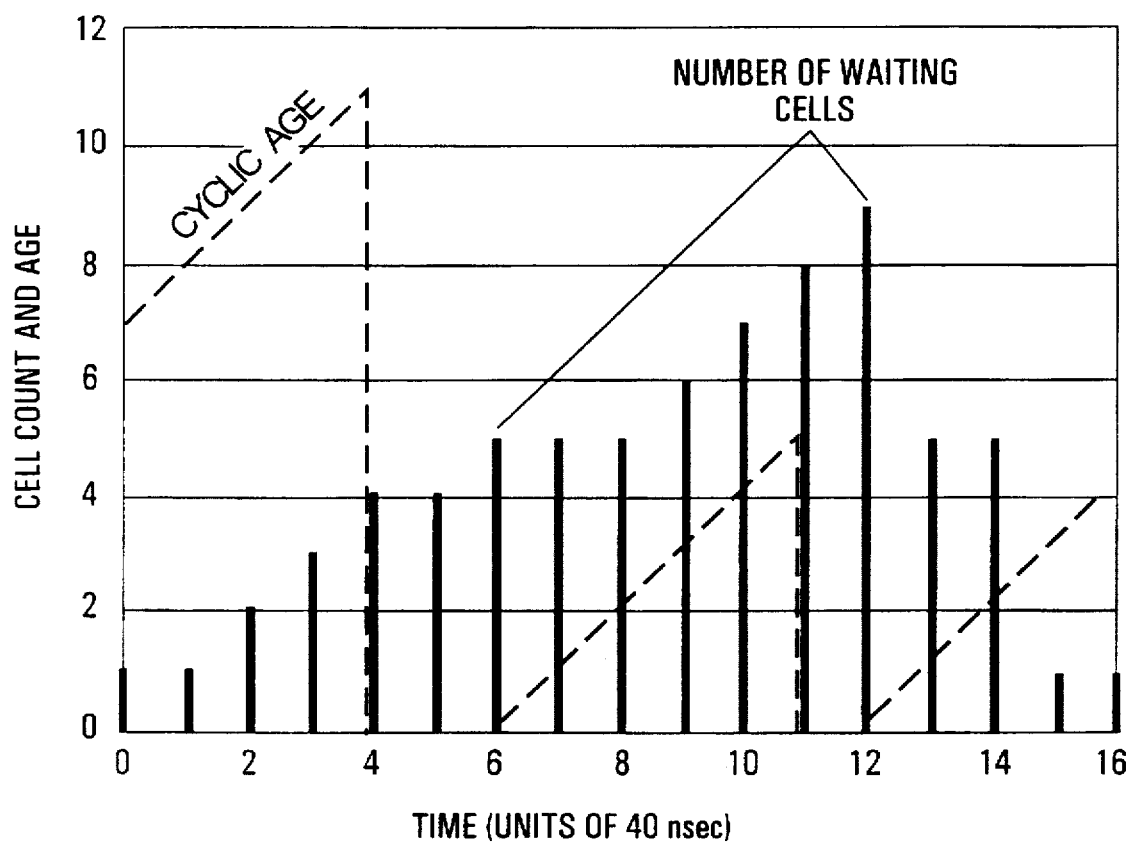
FIG. 8 is an exemplary graph illustrating the operation of the embodiment of FIG. 6.

Keeping track of the varying cell-group age may be done either by parallel counters or by using an eight-word memory (one-byte per word should suffice) to store the reset time of each destination queue. A subtraction (current queue rank of the critical cell minus the reset queue rank) is performed each time a destination queue is inspected for cell-transfer eligibility. For a small number of core fabrics, the use of parallel counters is preferable. The age-tracking process is illustrated in FIG. 8. In the figure, the solid lines indicate the number of waiting cells and the dashed lines indicate the updated cyclic age of the critical cell in the queue.

FIG. 9 illustrates, by means of an example, the inlet fabric scheduling function. Inlet fabric #5 is selected in this example. Assuming a folded configuration, all its traffic destined to outlet #5 is internally switched and the queue for outlet fabric #5 in the figure is shaded to indicate its irrelevance to the transfer-control process. In the figure, the arrows point to the critical cell in each destination queue. The age information is needed only for these critical cells. The queue for outlet fabric #4 is empty. The number of cells waiting in the queue for outlet fabric #6, denoted queue-6, is four, hence queue-6 is eligible for transferring a cell group and the age counter is reset to zero. The next cell to join queue-6 will set (i.e. enable and increment by one) the age-counter. After an age counter is set, its content is increased by one in each time slot.

FIG. 10 illustrates the arrival and scheduling processes for inlet fabric #1. One cell may arrive during a time slot. During four slots, a maximum of four cells would arrive and a maximum of four cells may be transferred to the core fabrics. At some arbitrary observation instant, the inlet scheduler selects queue-2 for cell transfer in time slot N. During the four slot period beginning with time slot N, three cells arrive. During the first slot, nothing arrives. Two cells destined to outlet fabric #2 then arrive in the subsequent two slots and a third cell destined to outlet fabric #4 arrives in the fourth slot. Queue-2 has now transferred four cells and gained two new cells as shown in the "snapshot" at time slot N+4. The age-counter of queue-2 was reset to zero when the four cells were transferred but was set to 1 when the first new cell arrived. The age of the critical cell in queue-2 at the end of the four-slot period (i.e. after time slot N+3) is three.

Figure 11:
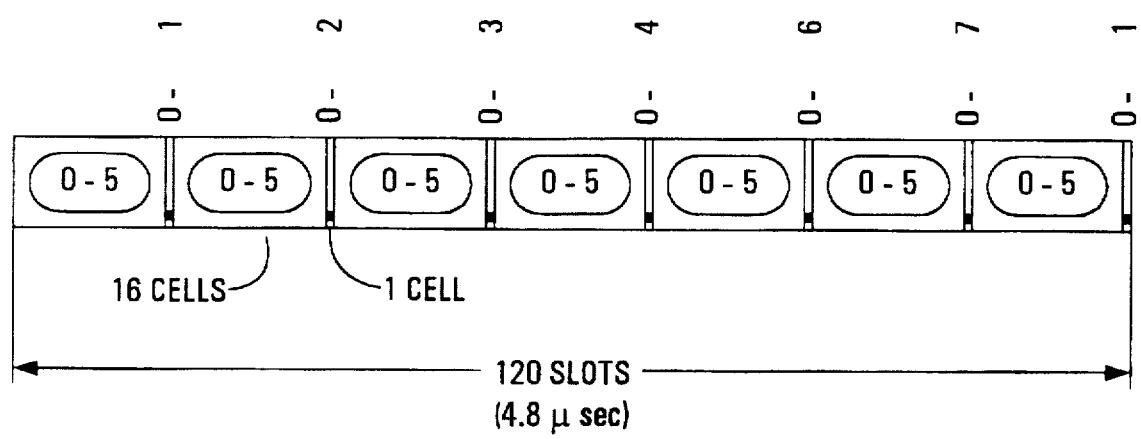
FIG. 11 is an exemplary chart illustrating cells transferred in the embodiment of FIG. 6.

Cell-transfer delay is caused by the time taken to either fill a cell-group (of four say) or meet the maturity requirement. The delay is zero if all the traffic of an inlet fabric is destined to a single outlet fabric. The delay can be relatively large when an inlet fabric strongly favours a particular outlet fabric and has very little traffic to other outlet fabrics. In such a case, the artificial maturity delay of the table of FIG. 6 must be imposed to reduce the rate of transfer of incomplete cell groups. FIG. 11 shows a case where inlet fabric #0 sends most of its traffic to outlet fabric #5, with only one cell destined to each other outlet arriving each seventeen time slots. The utilization of a transferred cell group is only 0.25 when it contains only one active cell, and the overall capacity loss is 0.75/17=0.044. This capacity loss can be offset by a corresponding rate expansion with the core speed being 1.044 times the outer speed.

While the switches of the example embodiments have been described as having the same number of inlet stage fabrics and outlet stage fabrics, this is not requisite. For example, if there were more outlet stage fabrics than inlet stage fabrics, this would simply mean that the inlet and core stage fabrics would require additional queues to represent these additional outlet stage fabrics. It is also not requisite that there be one-half as many core stage fabrics as inlet (or outlet) stage fabrics. If there were, say, five core stage fabrics, each cell burst from an inlet stage fabric would need to be a burst of five cells thereby providing a cell to each core stage fabric so that the cells from a burst would be aligned in the core. The choice of which clock cycles the queuers, schedulers and controllers respond to would depend upon the numbers of inlet, core and outlet stage fabrics.

Other modifications will be apparent to those skilled in the art and, therefore, the invention is defined in the clams.

What is claimed is:

1. A multi-stage ATM switch, comprising:

an inlet stage comprising a plurality of inlet stage fabrics;

a core stage comprising a plurality of core stage fabrics;

an outlet stage comprising a plurality of outlet stage fabrics, each of said outlet stage fabrics having a plurality of outlet ports;

each inlet stage fabric of said inlet stage fabrics having:

a queue representing each outlet stage fabric;

a plurality of inlet stage ports, with each inlet stage port connecting said each inlet stage fabric to one of said core fabrics such that there is an inlet stage port connecting said each inlet stage fabric to each of said core fabrics;

each core stage fabric of said core stage fabrics having:
a queue representing each outlet stage fabric;
a plurality of core stage ports with each core stage port connecting said each core stage fabric to one of said outlet stage fabrics such that there is a core stage port connecting said each core stage fabric to each of said outlet stage fabrics;
each of said outlet stage fabrics having a queue for each of said outlet ports;
for each of said inlet stage fabrics, an inlet stage queuer for queuing each incoming ATM cell in one said inlet stage queue based on destination information in said incoming cell which indicates an outlet stage fabric to which said incoming cell is destined;
for each of said core stage fabrics, a core stage queuer for queuing each incoming ATM cell incoming in one said core stage queue based on destination information in said incoming cell which indicates an outlet stage fabric to which said incoming cell is destined;
for each of said outlet stage fabrics, an outlet stage queuer for queuing each incoming ATM cell in one said outlet stage queue based on destination information in said incoming cell which indicates an outlet port to which said incoming cell is destined;
for each of said plurality of inlet stage fabrics, a scheduler for choosing one said inlet stage queue and, in a time interval, transmitting a group of consecutive ATM cells from said chosen inlet stage queue beginning with an ATM cell at a head of said chosen inlet stage queue, said group comprising as many ATM cells as there are core stage fabrics, one ATM cell of said group being transmitted to each of said core stage fabrics;
a plurality of core stage controllers, one controller for each of said plurality of core stage fabrics, said controllers for transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said inlet stage queue;
for each of said plurality of outlet stage fabrics, an outlet controller for transmitting ATM cells at heads of outlet stage fabric queues to the outlet ports represented by said queues.

2. The multi-stage switch of claim 1 wherein said scheduler is also for transmitting ATM cells in a group to said core stage fabrics such that an ATM cell in an inlet stage queue having a given rank in said queue is transmitted to a core stage fabric assigned to that rank.

3. The multi-stage switch of claim 2 wherein each said core controller is for, in a time interval, transmitting an ATM cell al a head of a core stage queue to a particular outlet stage fabric represented by said queue such that, in said time interval, each of said core stage fabrics transmits an ATM cell to said particular outlet stage fabric.

4. The method of claim 3 wherein the step of, in a time interval, for each of said core stage fabrics, transmitting an ATM cell at a head of a queue representing a chosen outlet stage fabric to the chosen outlet stage fabric comprises transmitting ATM cells in a time order based on said queue rank of said core fabrics.

5. The multi-stage switch of claim 4 wherein said time interval for any one said scheduler does not overlap with a time interval for any other said scheduler.

6. The multi-stage switch of claim 5 wherein there are a like number of inlet stage fabrics and outlet stage fabrics.

7. The multi-stage switch of claim 6 wherein there are one-half as many core stage fabrics as there are inlet stage fabrics.

8. The multi-stage switch of claim 6 wherein each inlet stage fabric is implemented on a fabric which also comprises one of said outlet stage fabrics and wherein, said scheduler locally routes ATM cells queued to a queue representing said one of said outlet stage fabrics.

9. The multi-stage switch of claim 5 wherein said scheduler is for choosing an inlet stage queue which has (i) at least as many ATM cells as there are core stage fabrics or (ii) which contains a cell which has been in the queue for at least a pre-defined time.

10. A method for switching ATM cells in a switch having an inlet stage comprising a plurality of inlet stage fabrics, a core stage comprising a plurality of wore stage fabrics, and an outlet stage comprising a plurality of outlet stage fabrics, each of said outlet stage fabrics having a plurality of outlet ports, comprising the steps of:

examining destination information of each ATM cell incoming to a given inlet stage fabric for an indication of an outlet stage fabric to which said incoming cell is destined and queuing said incoming cell in a queue of said given inlet stage fabric representing said outlet stage fabric;

for each of said plurality of inlet stage fabrics, choosing an inlet stage queue and, in a time interval, transmitting a group of consecutive ATM cells from said inlet stage queue beginning with an ATM cell at a head of said inlet stage queue, said group comprising as many ATM cells as there are core stage fabrics, one ATM cell of said group being transmitted to each of said core stage fabrics;

examining destination information of each ATM cell incoming to a given core stage fabric for an indication of an outlet stage fabric to which said incoming cell is destined and queuing said incoming cell in a queue of said given core stage fabric representing said outlet stage fabric;

transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said single inlet stage queue;

examining destination information of each ATM cell incoming to a given outlet stage fabric for an indication of an outlet port to which said incoming cell is destined and queuing said incoming cell in a queue of said given outlet stage fabric representing said outlet port;

transmitting any ATM cell at a head of each queue of an outlet stage fabric to the outlet port represented by said queue.

11. The method of claim 10 wherein each of said core stage fabrics is assigned a queue rank and each said group of cells is transmitted to said core stage fabrics from a queue such that a cell of a given rank in said queue is transmitted to a core stage fabric having the corresponding queue rank.

12. The method of claim 11 wherein the step of transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said single inlet stage queue comprises transmitting ATM cells in a time order based on said queue rank of said core fabrics.

13. The multi-stage switch of claim 11 wherein the step of, for each of said plurality of inlet stage fabrics, choosing an inlet stage queue and, in a time interval, transmitting a group of consecutive ATM cells comprises choosing a different, non-overlapping time interval, for each of said inlet stage fabrics.

14. The method of claim 10 wherein the step of, for each of said plurality of inlet stage fabrics, choosing an inlet stage queue and, in a time interval, transmitting a group of consecutive ATM cells from said inlet stage queue, comprises choosing an inlet stage queue on a circulating basis.

15. The method of claim 10 wherein the step of, for each of said plurality of inlet stage fabrics, choosing an inlet stage queue and, in a time interval, transmitting a group of consecutive ATM cells from said inlet stage queue, comprises choosing an inlet stage queue which has (i) at least as many ATM cells as there are core stage fabrics or (ii) which contains a cell which has been in the queue for at least a pre-defined time.

16. The method of claim 10 wherein there are as many outlet stage fabrics as inlet stage fabrics and each inlet stage fabric is implemented on a fabric including one of said outlet stage fabrics and including the step of examining destination information of each ATM cell incoming to a given inlet stage fabric for an indication of an outlet stage fabric to which said incoming cell is destined and where said destination information indicates said ATM cell is destined to said one of said outlet stage fabrics, transmitting said ATM cell directly to said one of said outlet stage fabrics.

17. A method for switching ATM cells in a switch having an inlet stage comprising a plurality of inlet stage fabrics, a core stage comprising a plurality of core stage fabrics, and an outlet stage comprising a plurality of outlet stage fabrics, each of said outlet stage fabrics having a plurality of outlet ports, comprising the steps of:

examining destination information of each ATM cell incoming to a given inlet stage fabric for an indication of an outlet stage fabric to which said incoming cell is destined and queuing said incoming cell in a queue of said given inlet stage fabric representing said outlet stage fabric;

for each of said inlet stage fabrics, parallel transferring a group of cells from a front of one of said queues representing one of said outlet stage fabrics to said core stage fabrics such that one cell of said group arrives at each one of said core stage fabrics and storing said arriving cells in queues of said core stage fabrics representing said one of said outlet stage fabrics such that a cell from said group stored in a queue of any given core stage fabric has a rank in said queue of said given core stage fabric which is the same as a rank of a cell from said group stored in a corresponding queue of any other core stage fabric;

transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said single inlet stage queue;

examining destination information of each ATM cell incoming to a given outlet stage fabric for an indication of an outlet port to which said incoming cell is destined and queuing said incoming cell in a queue of said given outlet stage fabric representing said outlet port;

transmitting any ATM cell at a head of each queue of an outlet stage fabric to the outlet port represented by said queue.

18. The method of claim 17 wherein each of said core stage fabrics is assigned a queue rank and each said group of cells is transmitted to said core stage fabrics from a queue such that a cell of a given rank in said queue is transmitted to a core stage fabric having the corresponding queue rank.

19. The method of claim 18 wherein the step of transmitting ATM cells from the heads of core stage queues to outlet stage fabrics represented by said core stage queues in such a way that cells transmitted to any particular outlet stage fabric which derived from a single queue in an inlet stage fabric maintain an order which is identical to an order such cells had in said single inlet stage queue comprises transmitting ATM cells in a time order based on said queue rank of said core fabrics.

* * * * *

UNITED STATES PATENT AND TRADEMARK OFFICE
CERTIFICATE OF CORRECTION

PATENT NO.  : 5,896,380
DATED       : APRIL 20, 1999
INVENTOR(S) : BROWN, David A. et al.

It is certified that error appears in the above-identified patent and that said Letters Patent is hereby corrected as shown below:

IN THE CLAIMS:

Column 11, Line 53, delete "al" and insert --at--

Column 12, Line 16, delete "wore" and insert --core--

Column 14, Line 18, delete "bad" and insert --had--

Signed and Sealed this

Seventh Day of September, 1999

Attest:

Q. TODD DICKINSON

Attesting Officer

Acting Commissioner of Patents and Trademarks